(12) United States Patent
Shaffer et al.

(10) Patent No.: US 6,363,145 B1
(45) Date of Patent: Mar. 26, 2002

(54) APPARATUS AND METHOD FOR AUTOMATED VOICE ANALYSIS IN ACD SILENT CALL MONITORING

(75) Inventors: Shmuel Shaffer, Palo Alto; William J. Beyda, Cupertino; Mark Skrzynski, Capitola; Florin M. Gheorghiu, San Jose, all of CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/135,985

(22) Filed: Aug. 17, 1998

(51) Int. Cl.$^7$ ................................................ H04M 1/00
(52) U.S. Cl. ........................ 379/265.02; 379/265.07; 379/309
(58) Field of Search ........................ 379/35, 265.01, 379/265.02, 265.07, 267, 268, 266, 201.01, 211, 220, 225, 309, 32.01; 704/255, 203, 207; 705/10; 346/33 R

(56) References Cited

U.S. PATENT DOCUMENTS

| | | | |
|---|---|---|---|
| 3,971,034 A | * 7/1976 | Bell, Jr. et al. | 346/33 R |
| 4,093,821 A | * 6/1978 | Williamson | 704/207 |
| 4,510,351 A | 4/1985 | Costello et al. | 179/27 D |
| 5,148,483 A | * 9/1992 | Silverman | 704/274 |
| 5,239,460 A | 8/1993 | LaRoche | 364/401 |
| 5,465,286 A | 11/1995 | Clare et al. | 379/34 |
| 5,703,935 A | * 12/1997 | Raissyan et al. | 379/88.12 |
| 5,712,954 A | * 1/1998 | Dezonno | 379/265.07 |
| 5,737,405 A | 4/1998 | Dezonno | 379/265 |
| 5,764,728 A | 6/1998 | Ala et al. | 379/35 |
| 5,790,635 A | * 8/1998 | Dezonno | 379/309 |
| 5,923,747 A | * 7/1999 | Van Berkum et al. | 379/265.02 |
| 5,987,109 A | * 11/1999 | Hara | 379/265.01 |
| 6,026,147 A | * 2/2000 | Yeo | 379/35 |
| 6,047,060 A | * 4/2000 | Fedorov et al. | 379/265.02 |
| 6,115,693 A | * 9/2000 | McDonough | 379/220.01 |
| 6,137,862 A | * 10/2000 | Atkinson et al. | 379/265.02 |
| 6,259,785 B1 | * 7/2001 | Shaffer et al. | 379/265.02 |

* cited by examiner

*Primary Examiner*—Ahmad Matar
*Assistant Examiner*—William J. Deane, Jr.

(57) ABSTRACT

A method and system for automated silent call monitoring in an automatic call distributor (ACD) environment includes configuring a set of call performance profiles which include voice data patterns which are descriptive of voice data transmissions during an ACD call and which are associated with substandard agent performance. Each voice data pattern has a corresponding threshold which represents the maximum number of detections tolerated in an ACD call prior to execution of a notification routine. A digital signal processor (DSP) monitors a first call between an agent terminal and a customer terminal for the voice data patterns and stores detection data in memory upon detecting of one of the voice data patterns. A central processor unit (CPU) compares the number of detections of the voice patterns within predetermined time intervals to the threshold numbers of detections represented in the thresholds to determine if any threshold has been exceeded. If no thresholds have been exceeded, the DSP continues to monitor for the voice data patterns. If a threshold has been exceeded, the CPU executes the notification routine wherein a supervisor terminal and the agent terminal are notified of the exceeded threshold. A supervisor notification can include an option to establish a direct monitoring session for the first call and an option to transfer the first call to the supervisor terminal. An agent notification preferably includes call performance analysis which provides suggestions for improving call performance which are responsive to the detected voice data patterns.

20 Claims, 3 Drawing Sheets

APPARATUS AND METHOD FOR AUTOMATED VOICE ANALYSIS IN ACD SILENT CALL MONITORING

BACKGROUND OF THE INVENTION

The present invention relates generally to methods and systems for ACD silent call monitoring and, more particularly, the invention relates to a method and system for ACD silent call monitoring utilizing automated voice analysis.

ACD systems are employed in a wide range of customer service environments and provide ACD users with an economical and powerful means for providing customer service. Calls can be automatically routed to ACD agents who possess the skills required for a particular call. Management of a customer service department is facilitated by the ability of a manager or supervisor to monitor calls directed to agents and to analyze performance of the agents. The supervisor, utilizing a single terminal, is able to conveniently switch between different ACD agent calls and thereby directly monitor the job performance of a large number of ACD agents.

An example of an ACD system for providing customer support for computers and peripheral devices might include a greeting which requires the customer to select from among computer related questions regarding printer malfunctions, an inability to run particular applications on the computer, and software installation problems. The option which the customer selects causes the ACD system to transfer the call to a particular agent whose skills match the needs of the customer, as indicated by the selection. Once the call has been answered by an ACD agent, a supervisor can silently monitor the call to evaluate the agent's performance and make recommendations.

If the ACD supervisor becomes familiar with the ACD agents whom the supervisor oversees, the supervisor is able to allocate his time effectively by spending a majority of time on those ACD agents whose skills require more development and spending less time supervising those ACD agents whose skills are already refined. However, if an ACD supervisor is not familiar with the ACD agents he supervises, either because of high agent turnover or because he is new to the job, the supervisor does not have the proper information to focus attention on those ACD agents who most urgently require it. Consequently, the supervisor wastes time monitoring agents who do not require supervision, while agents who urgently require supervision do not receive the attention they require.

A partial solution to the above described problem is provided in U.S. Pat. No. 5,737,405 to Dezonno, which describes an apparatus and method for detecting conversational interruptions in an ACD system, wherein the system includes a detection circuit for detecting when an agent and a customer are concomitantly talking during an incoming call. A caller audio signal detector detects customer audio signals representative of caller speech and an agent audio signal detector detects agent audio signals representative of agent speech. When the caller audio signal detector and the agent audio signal detector detect speech signals simultaneously, an interruption has occurred. Information regarding the interruptions is provided to a supervisor via a supervisor terminal and/or the agent via an agent terminal. The interruption information is presented by showing the agent identification, total call time, agent talk time, and the number of interruptions. Alternatively, the information is presented by showing the averages of total call time, agent talk time, and numbers of interruptions.

Detecting interruptions in incoming ACD calls provides a measure of insight into the performance of an ACD agent. However, there are numerous other indicia which provide a more complete description of agent performance during an incoming call. Furthermore, the Dezonno invention provides for transmitting notification of interruptions to the agent and supervisor terminals as they occur without any processing of the interruption data, or after the call is terminated in the form of a call report which represents the interruption data in a processed format. An ACD supervisor might not be able to effectively utilize the call interruption information in an unprocessed format during the call. Either the supervisor receives unprocessed call interruption data from numerous calls about agent interruptions as they occur, which can easily become overwhelming, or the supervisor receives processed data after the call is terminated, which is obviously too late for the supervisor to utilize during the call.

What is needed is a method and system for providing automated ACD call monitoring which enables a supervisor to utilize information generated by the monitoring during the pendency of the call and which provides a more complete description of agent performance than is currently available.

SUMMARY OF THE INVENTION

A method and system for silent ACD call monitoring utilizing automated voice analysis includes identifying multiple voice data patterns associated with substandard agent performance, monitoring a first call between an ACD agent terminal and a customer terminal to detect the voice patterns, determining whether the number of occurrences of any one of the voice data patterns exceeds an associated predetermined threshold, and notifying the agent terminal and/or a supervisor terminal upon detecting that a threshold number of voice data pattern occurrences has been exceeded.

In a preferred embodiment, the invention is practiced in an ACD system wherein incoming calls from customers are routed to multiple ACD agents. The monitoring of the first call can be performed at any one of multiple sites, including the agent terminal, the supervisor terminal, or another location which has access to both agent voice data and customer voice data.

A processor, such as a digital signal processor (DSP), is utilized to detect the voice data patterns associated with substandard performance. The voice data patterns include a length of silence in conversation between the customer and the agent in excess of a predetermined length which indicates either poor information delivery by the agent or lack of interest on the part of the customer. A conversation volume above a maximum volume level tends to indicate a high frustration level in either the customer or the agent. Changes in voice frequency in excess of a predetermined range during the conversation tend to indicate an emotional exchange. The average length of continuous conversation by the agent also provides information about agent call performance. If the average length of continuous agent conversation is above a maximum threshold, this tends to demonstrate that the agent is talking without paying sufficient attention to the customer. If the average length of continuous agent conversation is below a minimum threshold, this tends to show that the agent is not being responsive to the customer. Interruptions in conversation tend to indicate poor agent performance as well. An interruption of the agent by the customer demonstrates that the customer is frustrated and dissatisfied with the agent's responses, while interruptions by the agent demonstrate that the agent is being impatient and not listening to the customer.

Memory stores voice data pattern thresholds associated with the voice data patterns, such that each voice data pattern has a corresponding threshold. A threshold identifies a maximum number of occurrences of a corresponding voice data pattern which is tolerated during the first call between the agent and the customer. The thresholds can be configured to permit a predetermined number of occurrences for any given time interval during the first call and the number of occurrences permitted by thresholds associated with different voice patterns can differ. For example, the threshold number of agent interruptions per five-minute interval might be greater than the threshold number of occurrences of agent speech having volume above a predetermined level.

The number of occurrences of the voice data patterns are recorded by a counting device, the function of which can be performed by the DSP or a central processing unit (CPU). The number of detected occurrences of the voice data patterns is compared to the corresponding thresholds to determine whether any of the voice data patterns have been detected in excess of the corresponding threshold number of times. The comparison function can also be performed by either the DSP or the CPU. Upon discovering a voice data pattern which has been detected in excess of a threshold number of times, the CPU or DSP executes a notification routine to provide notification to the supervisor terminal and the agent terminal.

The monitoring of the first call for voice data patterns can occur at a different location from where the threshold comparisons take place. For example, the monitoring might take place at the agent terminal which transmits each detection to the supervisor terminal. The supervisor terminal calculates the total number of occurrences and determines whether any thresholds have been exceeded. When one of the thresholds is exceeded, the supervisor CPU causes a notification to be displayed on the supervisor terminal. The CPU can be configured to cause the notification device to include an option to establish a direct silent monitoring session with the agent terminal under specific circumstances. For example, if the agent's performance is poor, the notification can include an option to the supervisor to establish a direct monitoring session. The notification can also include an option to transfer the call from the agent terminal to the supervisor terminal if the agent's performance is determined to be particularly poor.

The notification routine can also provide notification to the agent terminal. In a preferred embodiment, the agent notification takes the form of performance analysis data which pertains to a detected voice pattern. For example, if the agent has interrupted the customer in excess of a threshold number of times, a message is displayed on the agent terminal which says "Avoid interrupting the customer." Alternatively the message can simply inform the agent of the number of times that the agent has interrupted the customer.

DETAILED DESCRIPTION

Figure 1:
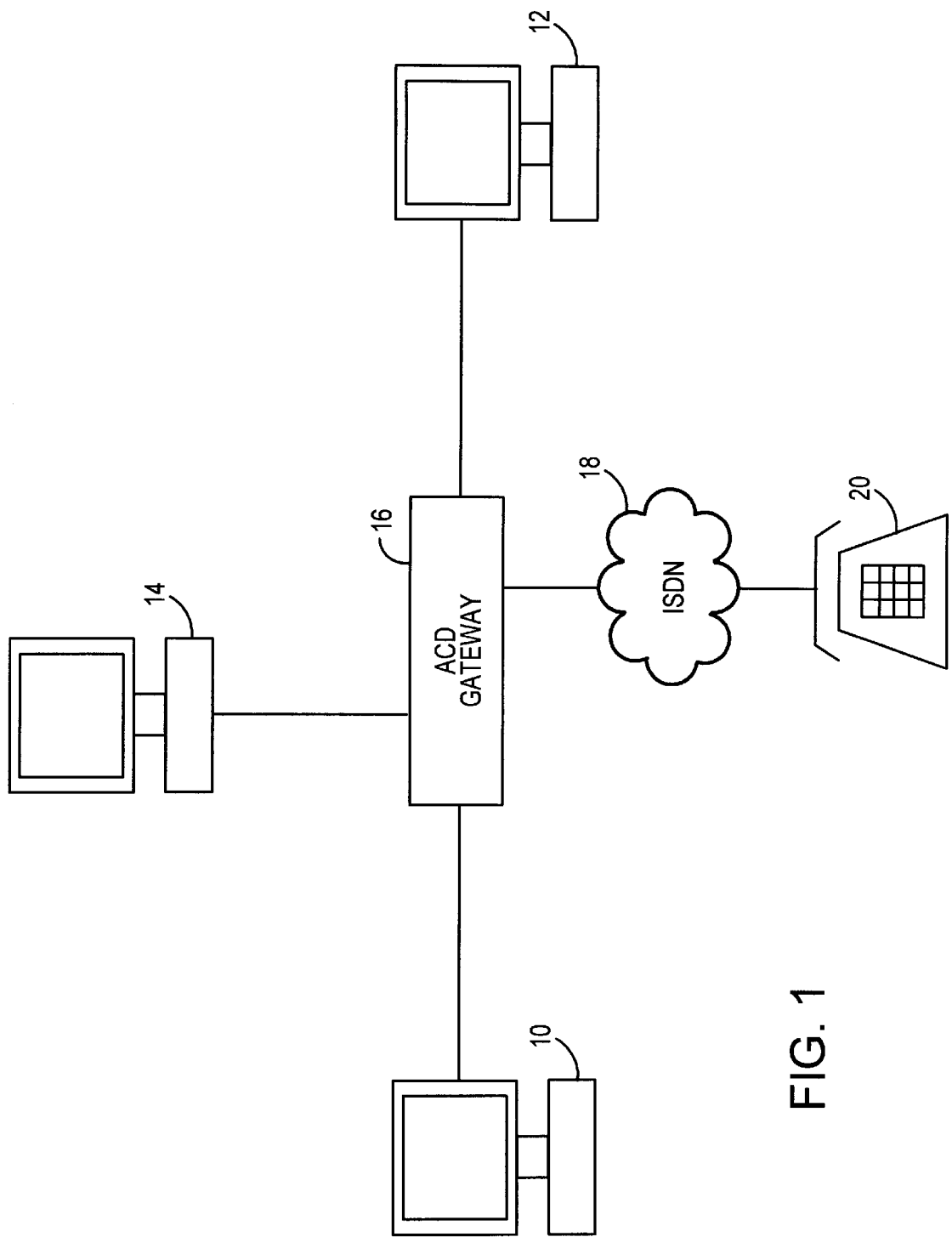
FIG. 1 is a block diagram of an ACD system in a telephony-over-LAN (TOL) environment in which the automated silent call monitoring system of the present invention operates.

With reference to FIG. 1, an ACD system which employs an automated silent call monitoring system of the present invention includes an ACD gateway 16 connected to first and second agent terminals 10 and 12 and a supervisor terminal 14. The first and second agent terminals and the supervisor terminal are located on a data network such as a local area network (LAN), and each terminal is enabled for telephony-over-LAN. The gateway enables the first and second agent terminals 10 and 12 and the supervisor terminal 14 to establish telephonic connections to communication devices on other communications networks, such as an integrated services digital network (ISDN) telephone 20 connected to the gateway 16 via an ISDN 18. Although FIG. 1 shows the present invention operating in a telephony-over-LAN based ACD system, a person familiar with the art will recognize that the automated silent call monitoring system can operate within a private branch exchange (PBX) or a conventional stand-alone ACD system.

The gateway 16 routes incoming calls to available agent terminals 10 and 12. Although only two ACD agent terminals are shown in FIG. 1, the ACD system can accommodate more agent terminals. Typically, the number of agent terminals is substantially greater in an ACD system than the number of supervisor terminals 14. The capability to automatically monitor ACD calls for voice data patterns associated with poor agent performance enables a supervisor to efficiently monitor a large number of ACD agents by focusing attention on those ACD agents who most urgently require supervision.

Figure 2:
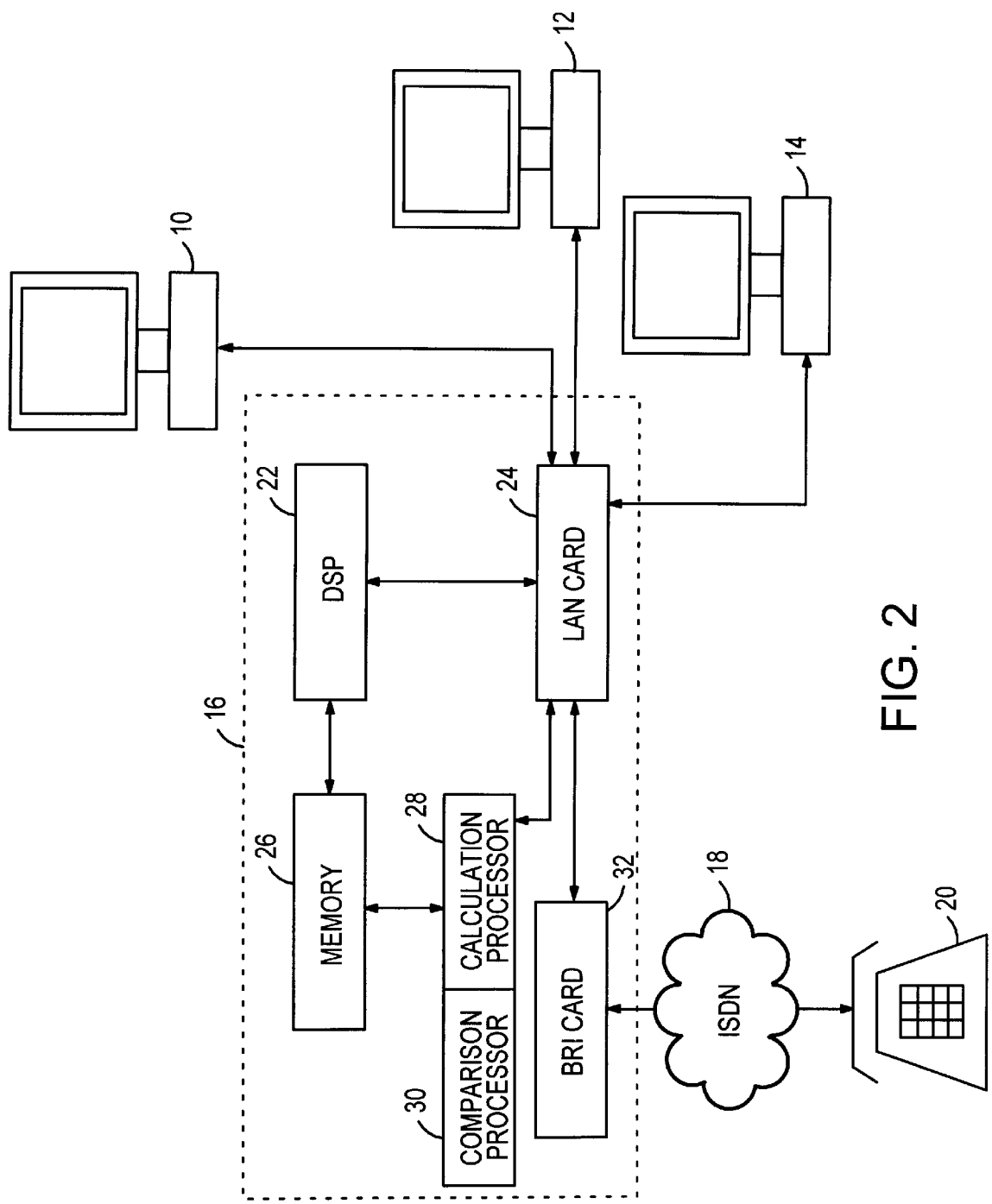
FIG. 2 is a block diagram of the automated silent call monitoring system embodied in a gateway shown in FIG. 1.

Referring to FIG. 2, the gateway 16 of the automated silent call monitoring system includes a LAN card 24 to enable communication between the first and second agent terminals 10 and 12 and the supervisor terminal 14. A basic rate interface (BRI) card 32 enables communication between the ISDN phone 20 and the first agent terminal 10, the second agent terminal 12 and the supervisor terminal 14. A digital signal processor (DSP) 22 analyzes agent voice data transmitted from either the first 10 or second agent terminal 12 and analyzes customer voice data transmitted from the ISDN phone 20 to detect the voice data patterns associated with poor customer service. The calculation processor 28, the comparison processor 30, and the DSP 22 have been illustrated in FIG. 2 as separate devices for purposes of clarity. However, the functions of all three can be incorporated into a single processor.

The voice data patterns include a length of silence in conversation between an agent and customer exceeding a predetermined time interval which tends to indicate that the agent is not providing efficient delivery of information. A volume level of the conversation above a predetermined level and fluctuations in voice frequency outside of a predetermined range both tend to indicate a high level of frustration in the agent, the customer, or both. An average continuous interval of agent conversation in excess of a predetermined interval tends to indicate that the agent is talking excessively and not engaging the customer, whereas an average continuous length of conversation below a minimum interval tends to indicate that the agent is not responding effectively to the customer and that the customer is having to work too hard to get information out of the agent. Excessive interruptions by the customer can indicate that the agent is not giving the customer sufficient opportunities to talk during the conversation, whereas excessive interruptions by the agent tend to indicate that the agent is being impatient and rude with the customer.

When the DSP 22 detects one of the voice data patterns, the DSP enters data representing the detection into memory 26. The calculation processor 28 accesses the detection data and updates the calculation of the number of detections that have occurred in an ACD call during a predetermined time interval. The predetermined time interval can be configured differently for each type of voice data pattern. For example, the calculation processor might calculate the total number of customer interruptions by the agent within a five-minute interval, whereas the total number of detections of occurrences of a voice exceeding the predetermined volume level might be calculated over a ten-minute interval. Logically, the more urgent the detection of a particular voice pattern is, the smaller the interval will be over which the number of detections is calculated, because a number of threshold detections for the more urgent voice pattern will be more quickly identified at the outset of the call. For example, detection of voice volumes over a certain high volume level indicates that communication in the call has severely deteriorated such that a single detection might require urgent attention. The time interval associated with such an event might be as short as 10 seconds.

After the calculation processor 28 updates the number of detections of a voice pattern, the comparison processor 30 accesses threshold data from memory 26 to determine whether a threshold number of detections has been exceeded. The parameters of the voice data pattern thresholds can be configured according to the requirements of the system user. For example, the tolerance for interruptions for a technical support agent will most likely be higher than for a catalog sales agent, because the technical support agent might be required to direct the conversation to a greater extent than the catalog sales agent. The comparison processor 30 compares the number of detections of the voice data pattern with the threshold number of detections indicated by the threshold data corresponding to that voice data pattern. If the comparison processor 30 determines the threshold has been exceeded, it causes a notification routine to be executed to provide notification to the supervisor terminal 14 and one of the agent terminals 10 and 12.

Although the automated silent call monitoring is shown in FIG. 2 as being performed in the gateway, it can be performed at the agent terminals 10 and 12, the gateway 16, the supervisor terminal 14, or the monitoring can be distributed amongst these devices. For example, the DSP 22 can be located in the agent terminal where it monitors a call to the ISDN phone 20 for the voice data patterns. If the DSP detects a voice data pattern, it can transmit data representative of the detection to the supervisor terminal 14, where it is entered into memory 26. The calculation processor 28 and the comparison processor 30, located in the supervisor terminal, process the detection data to determine if the corresponding voice data pattern threshold has been exceeded.

The location of the monitoring can also be dynamically altered during a call between one of the agent terminals 10 and 12 and the ISDN phone 20. Wherever the automated silent monitoring takes place, the monitoring location should have access to both the agent voice data and the customer voice data. If the first agent terminal 10 and the ISDN phone 20 are connected over a first call, the agent terminal might initially perform the entire automated monitoring process. If demands on the first agent terminal's processor resources increase to an extent that the agent terminal can no longer continue to perform the automated monitoring, the agent voice data, the customer voice data, and the monitoring session data can be transmitted to the supervisor terminal 14 or the gateway 16, where the monitoring session can be continued.

The DSP 22 monitors for simultaneously transmitted agent voice data and customer voice data to detect interruptions during calls between one of the agent terminals 10 and 12 and the ISDN phone 20. Simultaneous transmission of agent voice data and customer voice data indicates an interruption has occurred. More specifically, the DSP can determine which of the two parties is the interrupting party by determining whether the agent voice data was continuously transmitted prior to simultaneous transmission of customer voice or whether the customer voice data was continuously transmitted prior to simultaneous transmission of agent voice data. The DSP 22 monitors the pitch of the agent's voice in agent voice data and the customer's voice in customer voice data to determine whether a fluctuation outside of a predetermined frequency range occurs. The DSP 22 also separately monitors the agent voice data and the customer voice data for speech volume and the average time interval of continuous speech to determine whether the speech volume or the continuous speech interval are outside of predetermined ranges.

Separately monitoring agent voice data and customer voice data for voice patterns is important because a particular voice pattern can have different meanings depending on whether the voice pattern was detected in the agent voice data or the customer voice data. Detection of customer voice data above a predetermined threshold might be more readily tolerated than detection of agent voice data over the same predetermined threshold. For example, if the ACD is setup to provide customer technical support, the customers are often irate at the outset of the call as a result of the technical problem for which they are calling. The threshold number of occurrences of the customer speaking at a volume above the predetermined volume level might be relatively higher than the threshold number of occurrences of the agent speaking above the predetermined volume level.

When a voice data pattern has been detected in excess of the threshold number of times, the supervisor terminal 14 is notified of the event. The comparison processor 30 accesses supervisor notification data from memory 26 for transmission to the supervisor terminal. The notification can be in the form of a message displayed on a monitor of the supervisor terminal, reflecting detection of the voice data pattern in excess of the threshold number of occurrences. The notification can also include an option to the supervisor to establish a direct monitoring session, so that the supervisor can directly monitor the agent's performance for the remainder of the call. The comparison processor can be configured to provide the supervisor terminal with an option to transfer the first call from the first agent terminal 10 to the supervisor terminal 14, if the automated monitoring session indicates that the agent's call performance is particularly poor. For instance, if the agent is yelling at the customer and interrupting the customer as well, the message might include an option to transfer the call from the first agent terminal 10 to the supervisor terminal 14.

The comparison processor 30 can also be configured to access agent notification data from memory 26 for presentation at the one of the agent terminals 10 and 12 in response to detecting occurrences of a voice data pattern in excess of the threshold number of times. The agent notification can simply indicate the call performance error associated with the voice data pattern, or it can include call performance analysis which provides suggestions for the agent to improve the agent's call performance. For example, if the agent has interrupted the customer in excess of the threshold number of times, the notification might be in the form of a message on the agent terminal's monitor that says "Avoid interrupting the customer."

Figure 3:
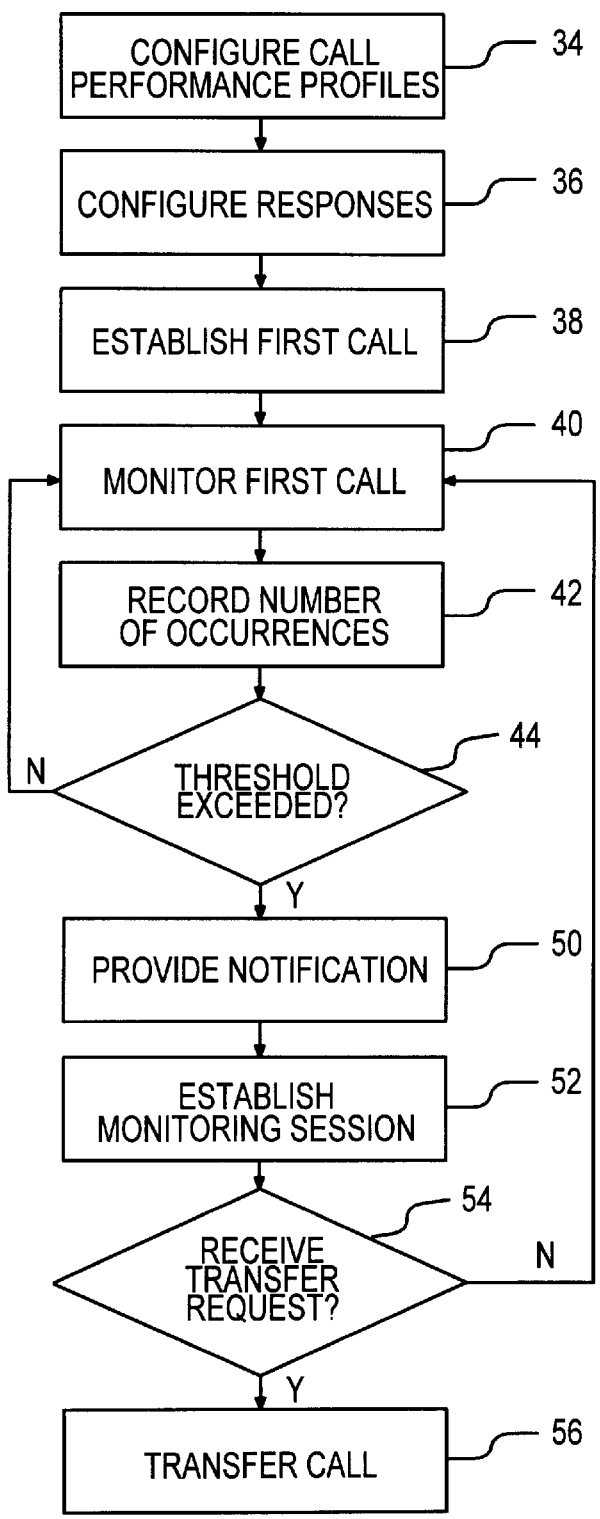
FIG. 3 is a process flow of a method for performing silent call monitoring according to the present invention.

Referring to FIGS. 2 and 3, a method for automated silent call monitoring includes the step 34 of configuring call performance profiles. Each call performance profile includes a voice data pattern which is descriptive of a characteristic of poor agent service during an ACD call with a customer, and at least one corresponding voice data pattern threshold which represents the maximum number of times the voice data pattern may be detected within a predetermined time interval before a notification procedure will be executed. Some call performance profiles might include two voice data pattern thresholds, including an agent threshold and a customer threshold. The voice data patterns include interruption in conversation by the agent and the customer, speech by the agent or the customer in excess of a predetermined volume level, fluctuations in the pitch of the voice of the customer or the agent in excess of a predetermined range, intervals of silence in the conversation in excess of a predetermined interval, and intervals of continuous agent or customer speech in excess of a maximum interval and below a minimum interval.

In step 36, agent notification messages are configured which will be presented at the agent terminal upon detection of one of the voice data patterns in excess of the threshold number of times. The agent notification messages preferably contain call performance analysis data providing suggestions to improve agent call performance.

In step 38, a first call is established between a first ACD agent terminal 10 and a customer phone 20. A DSP 22 monitors the first call in step 40 to detect any of the voice data patterns and in step 42, the DSP records detected voice data patterns into memory 26. In step 44, a comparison processor 30 determines whether the number of recorded voice data pattern detections for any of the voice data patterns exceeds a threshold. If no threshold is exceeded, the call continues to be monitored in step 40. The comparison processor 30 can also be configured to compare the number of voice data pattern detections between multiple calls to determine which call requires more urgent attention. For example, if a second call were established between the second agent terminal 12 and a second ISDN phone (not shown), the DSP 22 would simultaneously monitor both calls. If a threshold number of detections occurred in both the first and second calls, the comparison processor 30 can be configured to compare the number of detections in the first and second calls to determine which call requires more urgent attention. The specific types of voice data patterns that were detected in the first and second calls can also be considered in determining which call requires more urgent attention.

If a threshold number of detections is exceeded for any of the voice data patterns, in step 50 a notification routine is executed. The notification routine includes presenting a message at a supervisor terminal 14 which reflects detection of the threshold number of voice pattern occurrences in the first call. The message can also include an option to establish a direct monitoring session between the first agent terminal 10 and the supervisor terminal 14 and an option to transfer the call from the first agent terminal to the supervisor terminal. The notification routine further includes presenting a notification message at the agent terminal 10. The agent notification message includes call performance analysis data which includes suggestions for improving agent call performance.

In step 52, the direct monitoring session is established between the supervisor terminal 14 and the first agent terminal 10, if the supervisor elects the option to establish the direct monitoring session in response to the supervisor notification. During the monitoring session, the agent voice data and the customer voice data are transmitted to the supervisor terminal and the supervisor is able to provide suggestions for improving the agent call performance, either through written messages transmitted to the agent terminal or verbal comments transmitted to the agent in the monitoring session. Neither the written messages nor the verbal comments are transmitted to the customer in the call between the agent and the customer. In step 54, a determination is made whether the supervisor has elected to have the first call transferred to the supervisor terminal. If the supervisor has chosen the transfer option, in step 56 the call is transferred to the supervisor terminal 14. If the call transfer option has not been selected, the first call continues to be monitored for the voice data patterns.

What is claimed is:

1. A method for automated silent call monitoring utilizing automated analysis of speech characteristics comprising the steps of:

configuring call performance profiles representative of a plurality of voice patterns, with each said voice pattern being associated with a predetermined threshold number of occurrences;

monitoring a first call between an agent at an agent terminal and a customer at a customer terminal for occurrences of said plurality of voice patterns during a conversation between said agent and said customer;

maintaining a record of a number of occurrences for each of said voice patterns during said conversation;

determining whether a number of occurrences of a particular one of said voice patterns exceeds said predetermined threshold number associated with said particular one; and initiating a notification routine upon detecting said number of occurrences exceeding said predetermined threshold number.

2. The method of claim 1 wherein said step of initiating said notification routine includes providing notification to said agent terminal during a pendency of said first call.

3. The method of claim 1 wherein said step of monitoring said first call for said plurality of voice patterns includes monitoring said first call for at least one of a voice signal transmitted over said first call representative of speech having a volume which exceeds a predetermined volume level, an interval of silence between transmissions of speech over said first call which exceeds a predetermined silence interval, an interval of continuous agent speech length below a minimum interval, a continuous agent speech length above a maximum interval, and a fluctuation in pitch of speech which exceeds a predetermined fluctuation range.

4. The method of claim 1 further comprising the step of configuring a response for each of said plurality of voice patterns, each response includes call performance analysis data associated with a corresponding voice pattern, said step of initiating said notification routine including transmitting one of said responses to said agent terminal.

5. The method of claim 1 wherein said monitoring step includes monitoring a plurality of calls, the method further comprising the step of comparing first call voice pattern occurrences with second call voice pattern occurrences to determine which of said first call and said second call requires more urgent supervision.

6. The method of claim 1 wherein said initiating step includes providing notification to a supervisor terminal together with an option to establish a silent call monitoring session at said supervisor terminal for directly monitoring said first call.

7. The method of claim 6 wherein said step of providing said notification further includes providing an option to transfer said first call from said agent terminal to said supervisor terminal.

8. The method of claim 1 wherein said step of providing said notification further includes providing an option to transfer said first call from said agent terminal to said supervisor terminal.

9. The method of claim 6 further comprising the step of transmitting supervisor voice data in said silent call monitoring session to said agent terminal in the absence of transmitting said supervisor voice data to said customer terminal.

10. The method of claim 6 wherein said monitoring step is performed at one of said supervisor terminal and said agent terminal.

11. A system for performing silent call monitoring utilizing automated voice pattern detection to monitor a first call between an agent at an agent terminal and a customer at a customer terminal in an automatic call distributor (ACD) environment comprising:

voice monitoring circuitry for detecting substandard performance of an agent user of said agent terminal during said first call, said voice monitoring circuitry comprising:
a) means for detecting a plurality of voice data patterns associated with said substandard performance of said agent;
b) memory including voice data pattern thresholds corresponding to said voice data patterns such that each voice data pattern has a corresponding threshold;
c) means for comparing a total number of detected occurrences of a voice data pattern to a corresponding threshold; and notification means for providing notification upon detection of a number of said occurrences of one of said voice data patterns which is in excess of said corresponding threshold of said one.

12. The system of claim 11 wherein said detecting means is configured to detect at least one of a length of silence in conversation between said agent and said customer in excess of a predetermined time interval, a conversation volume in excess of a predetermined volume level, voice frequency changes in excess of a predetermined fluctuation range, a continuous agent conversation interval above a maximum interval, and a length of continuous agent conversation below a minimum length.

13. The system of claim 11 wherein said comparing means is configured to compare said total number of detected occurrences within a predetermined time interval to said corresponding threshold.

14. The system of claim 11 wherein said notification means is configured to transmit said notification to a remote supervisor terminal together with an option to establish a monitoring session call between said supervisor terminal and said agent terminal.

15. The system of claim 14 wherein said memory further includes call performance analysis data associated with said voice data patterns such that each voice data pattern has associated call performance analysis data, said notification means being configured to present said call performance analysis data at said agent terminal upon detection of occurrences in excess of said threshold number of voice data pattern occurrences.

16. The system of claim 14 wherein said voice monitoring circuitry is configured to simultaneously detect substandard performance of a plurality agents, said comparing means being further configured to compare detected occurrences of said voice data patterns in said first call with detected occurrences of said voice data patterns in a second call to determine a relative urgency associated with said first and said second calls.

17. A method for silent monitoring of a first call between a customer and an ACD agent in an ACD system comprising the steps of:

configuring voice pattern profiles to be descriptive of a plurality of voice patterns associated with substandard agent call performance wherein each voice pattern profile includes an associated threshold number of detections, said voice patterns including at least one of a length of silence in conversation between said agent and said customer in excess of a predetermined time interval, a conversation volume in excess of a predetermined volume level, voice frequency changes in excess of a predetermined fluctuation range, a continuous agent conversation interval above a maximum interval, and a length of continuous agent conversation below a minimum length;

monitoring said first call for occurrences of said voice patterns;

recording detections of said voice patterns in said first call;

determining whether a number of detections of one of said voice patterns exceeds an associated threshold; and if said number of detections exceeds said associated threshold, executing a notification routine which provides notification of said detections to at least one of said agent terminal and an ACD supervisor terminal.

18. The method of claim 17 wherein said executing step includes providing an option to said ACD supervisor terminal of establishing a monitoring session for said first call.

19. The method of claim 18 wherein said executing step further includes transmitting call performance analysis data to said agent terminal.

20. The method of claim 16 wherein said monitoring step includes monitoring a plurality of calls, the method further comprising the step of comparing said detections of said voice patterns in said first call with detections of voice patterns from a second call to determine relative urgency associated with said first and said second call.

* * * * *